(12) United States Patent
Kato et al.

(10) Patent No.: US 7,468,995 B2
(45) Date of Patent: Dec. 23, 2008

(54) OPTICAL SWITCH

(75) Inventors: Yoshichika Kato, Tokyo (JP); Yoshihiko Hamada, Tokyo (JP); Keiichi Mori, Tokyo (JP); Osamu Imaki, Tokyo (JP); Kenji Kondou, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 113 days.

(21) Appl. No.: 11/789,771

(22) Filed: Apr. 24, 2007

(65) Prior Publication Data
US 2007/0253045 A1 Nov. 1, 2007

(30) Foreign Application Priority Data
Apr. 27, 2006 (JP) .............................. 2006-124227

(51) Int. Cl.
*H01S 3/30* (2006.01)
*H01S 3/121* (2006.01)
*G02B 6/42* (2006.01)
*G02B 26/08* (2006.01)

(52) U.S. Cl. ............................... 372/8; 372/14; 385/18; 359/196

(58) Field of Classification Search ..................... 372/8, 372/14; 359/196; 385/18
See application file for complete search history.

(56) References Cited

FOREIGN PATENT DOCUMENTS

| JP | 01-306811 | 12/1989 |
|---|---|---|
| JP | 2003-043270 | 2/2003 |
| JP | 2003-248180 | 9/2003 |

*Primary Examiner*—Armando Rodriguez
(74) *Attorney, Agent, or Firm*—David N. Lathrop, Esq.; Gallagher & Lathrop

(57) ABSTRACT

An optical switch, wherein the first and second output ports (optical fibers) are disposed on the opposite sides of the input port (optical fiber) so as to form acute angles with respect to the input port, the input port and the first output port are optically coupled to each other through a first mirror surface, and the input port and the second output port are optically coupled to each other through a second mirror surface. The incident angles of an incident light beam with respect to the mirror surfaces are equalized, and optical path lengths between the input port and the first and second output ports are equalized. The actuator inserts and withdraws the second mirror surface on a position at the front of the first mirror surface.

10 Claims, 6 Drawing Sheets

OPTICAL SWITCH

TECHNICAL FIELD

The present invention relates to an optical switch used in the field of optical communications and so on.

BACKGROUND ART

Of optical switches using mirrors for switching optical paths, some use one-time reflection on a mirror and others use reflection twice before light from an input port is coupled to an output port. For example, from the viewpoint of a change in the polarization state of light due to reflection, a smaller number of times of reflection on a mirror is more preferable and a smaller incident angle relative to the mirror is more preferable.

FIG. 5A illustrates the configuration of patent literature 1 as a conventional example of a 1×2 optical switch. In FIG. 5A, reference numeral 11 denotes an input optical fiber and reference numerals 12 and 13 denote output optical fibers. Reference numeral 14 denotes a movable mirror and reference numeral 15 denotes a fixed mirror.

In this example, light from the input optical fiber 11 is reflected on the fixed mirror 15 and is optically coupled to the output optical fiber 13. Further, the movable mirror 14 moves to interrupt the optical path, so that the light from the input optical fiber 11 is reflected on the movable mirror 14 and is optically coupled to the output optical fiber 12. In other words, optical paths are switched by moving the movable mirror 14.

The movable mirror 14 is disposed on a driving part 16 shaped like a seesaw having a bar supported by a fulcrum, and the movable mirror 14 is moved in and out of the optical path by the rotation (seesaw movement) of the driving part 16. In FIG. 5A, reference numerals 17a and 17b denote electromagnetic coils for attracting the bar of the driving part 16. The bar is made of a soft magnetic material. Reference numeral 18 denotes a case.

FIG. 5B shows the detailed relationship between the mirrors and the optical paths of FIG. 5A. In FIG. 5B, $\alpha_b$ denotes an incident angle (=reflection angle) of light relative to the movable mirror 14 and $\alpha_c$ denotes an incident angle (=reflection angle) of light relative to the fixed mirror 15. In patent literature 1, the incident angles $\alpha_b$ and $\alpha_c$ are set at 20° or smaller, $\alpha_b \neq \alpha_c$ is set, and since there is a difference between the angles $\alpha_b$ and $\alpha_c$, it is possible to prevent the output optical fibers 12 and 13 from overlapping each other. The specific numerical examples in Patent literature 1 are $\alpha_b=8°$ and $\alpha_c=13°$.

In the above optical switch described in patent literature 1, the number of times of reflection on the mirror is one and the incident angle of light on the mirror is suppressed to 20° or smaller. In this respect, this optical switch is preferable because a change of the polarization state of light is small. However, this optical switch is characterized in that the incident angles of light relative to the two mirrors are changed, and thus the two outgoing light beams reflected and emitted from the two mirrors do not have the same polarization state, that is, the configuration of this optical switch is not suitable for a request to match the polarization states of the outgoing light beams with high accuracy.

In the 1×2 optical switch using the two mirrors, in order to accurately match the polarization states of the outgoing light beams which are switched and emitted, it is preferable to equalize the incident angles of light to the two mirrors. Patent literature 2 describes a mirror layout and an optical path configuration for equalizing the incident angles of light to two mirrors.

However, in the configuration of patent literature 2, the two mirrors cannot be placed close to each other on an optical path and a large clearance is necessary between the two mirrors. This is because two output ports are disposed on the same side with respect to an input port. This point will be specifically described below with reference to FIG. 6. In FIG. 6, the input port 11 and the two output ports 12 and 13 are optical fibers and the optical fibers 11, 12, 13 and two mirrors 14 and 15 are indicated by the same reference numerals as those in FIG. 5A.

Two mirrors 14 and 15 are disposed in parallel with each other to equalize the incident angles of light to the mirrors 14 and 15, and two output optical fibers 12 and 13 have optical axes disposed in parallel with each other. In this case, the following relationship is established:

$$EF \cdot \sin \angle FEG = FG$$

where E and F represent the reflection points of light on the mirrors 14 and 15, the light being incident from an input optical fiber 11, and FG represents a perpendicular line from a point F to the optical axis of an output optical fiber 12.

When light to the mirrors 14 and 15 has an incident angle of, for example, 10°, $\angle FEG=20°$ is established. Further, when the output optical fibers 12 and 13 are $\phi 125$ μm in diameter (clad diameter) and a distance between the optical axes of the output optical fibers 12 and 13 is 125 μm which is equal to the clad diameter, FG=125 μm is established and a distance EF between the mirrors on an optical path is determined by the formula below:

$$EF=125/\sin 20°=365 \text{ μm}$$

Such a large clearance between the two mirrors 14 and 15 causes the following problem: In the case where the input optical fiber 11 has, for example, a rod lens on the end of the fiber and has a light-gathering function, the position of a beam waist (a position where a beam diameter is minimized, that is, the focal position of a lens provided on the end of the optical fiber) formed by light from the input optical fiber 11 is aligned with one of the two mirrors 14 and 15 and is considerably separated away from the other. For example, when the position of the beam waist is aligned with the mirror 15, the mirror 14 is irradiated with a larger light spot and thus the area and the driving stroke of the mirror 14 inevitably increase. On the other hand, when the position of the beam waist is aligned with the mirror 14, the mirror 15 is irradiated with a larger light spot and thus the area of the mirror 15 inevitably increases.

Such an increase in mirror area causes a serious problem in an optical switch of, for example, a MEMS (Micro Electro Mechanical System). In other words, it is necessary to increase the thickness of a silicon layer (silicon device layer) making up the mirror and accurately etch the thick silicon device layer in a perpendicular direction. Further, an increase in driving stroke causes a problem of an increase in driving voltage required for an actuator.

Patent literature 1: Japanese Patent Application Laid-Open No. 2003-248180

Patent literature 2: Japanese Patent Application Laid-Open No. H01-306811

DISCLOSURE OF THE INVENTION

In view of the above problems, an object of the present invention is to provide an optical switch which can obtain two outgoing light beams with matched polarization states and can be easily configured by MEMS.

An optical switch of the present invention comprises:

a substrate;

mirror means disposed on the substrate, the mirror means having first and second mirror surfaces whose extended surfaces intersecting each other at a predetermined angle and being orthogonal to a surface of the substrate;

first optical waveguide means disposed on the substrate, the first optical waveguide means having an end forming an optical path at an equal angle with respect to the first mirror surface and the second mirror surface;

second and third optical waveguide means disposed on the substrate so as to form acute angles with respect to both sides of the first optical waveguide means, the second and third optical waveguide means having ends optically coupled to the end of the first optical waveguide means in response to reflection on the first and second mirror surfaces; and an actuator disposed on the substrate, the actuator driving the mirror means to optically couple the end of the second or third optical waveguide means and the end of the first optical waveguide means through one of the first mirror surface and the second mirror surface;

wherein an optical path length between the ends of the first and second optical waveguide means optically coupled through the first mirror surface and an optical path length between the ends of the first and third optical waveguide means optically coupled through the second mirror surface are equal to each other.

BEST MODES FOR CARRYING OUT THE INVENTION

An exemplary embodiment of the present invention will now be described based on examples with reference to the accompanying drawings.

Figure 1:
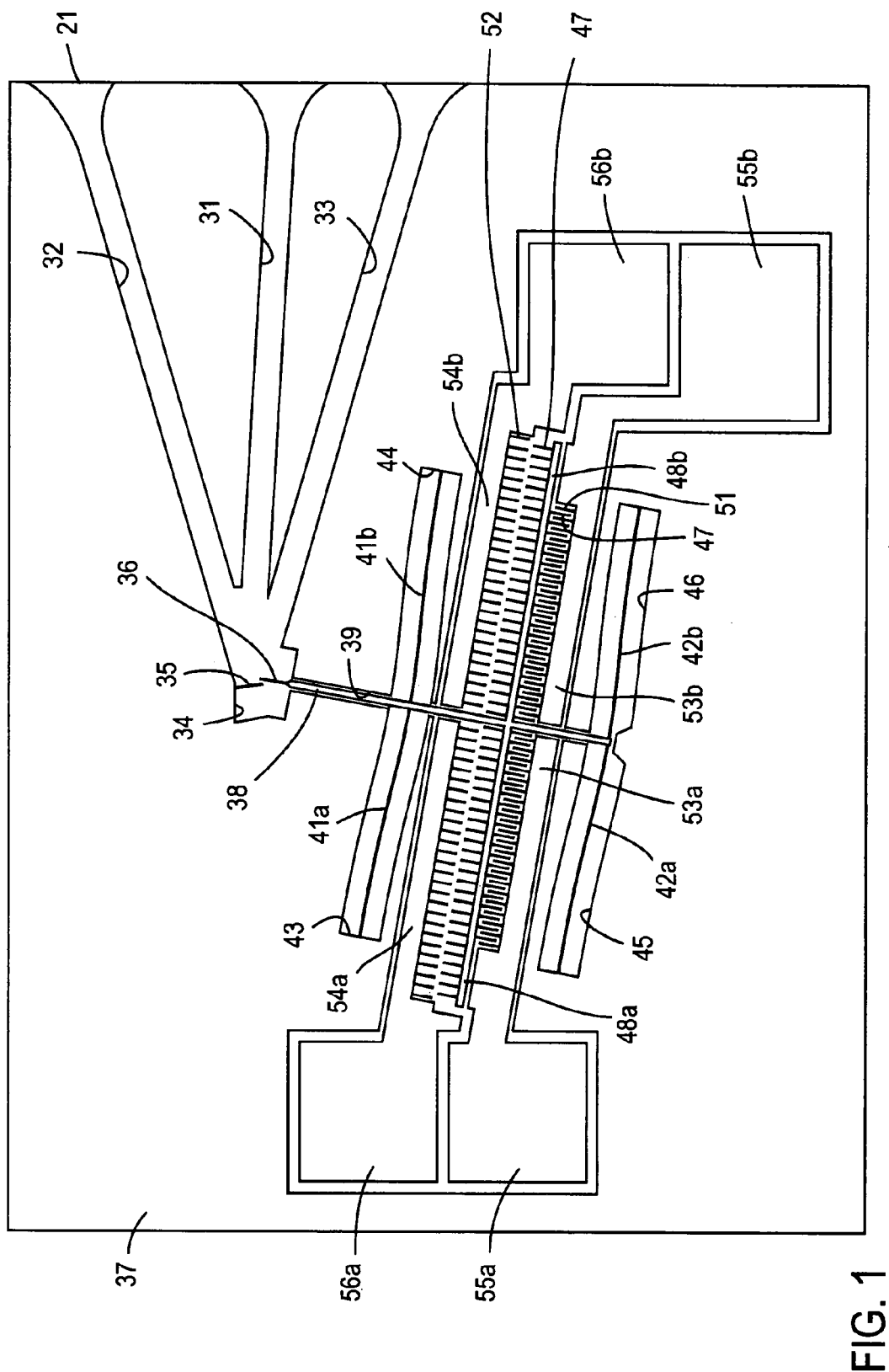
FIG. 1 is a plan view for explaining the configuration of an example of an optical switch according to the present invention.
Figure 4:
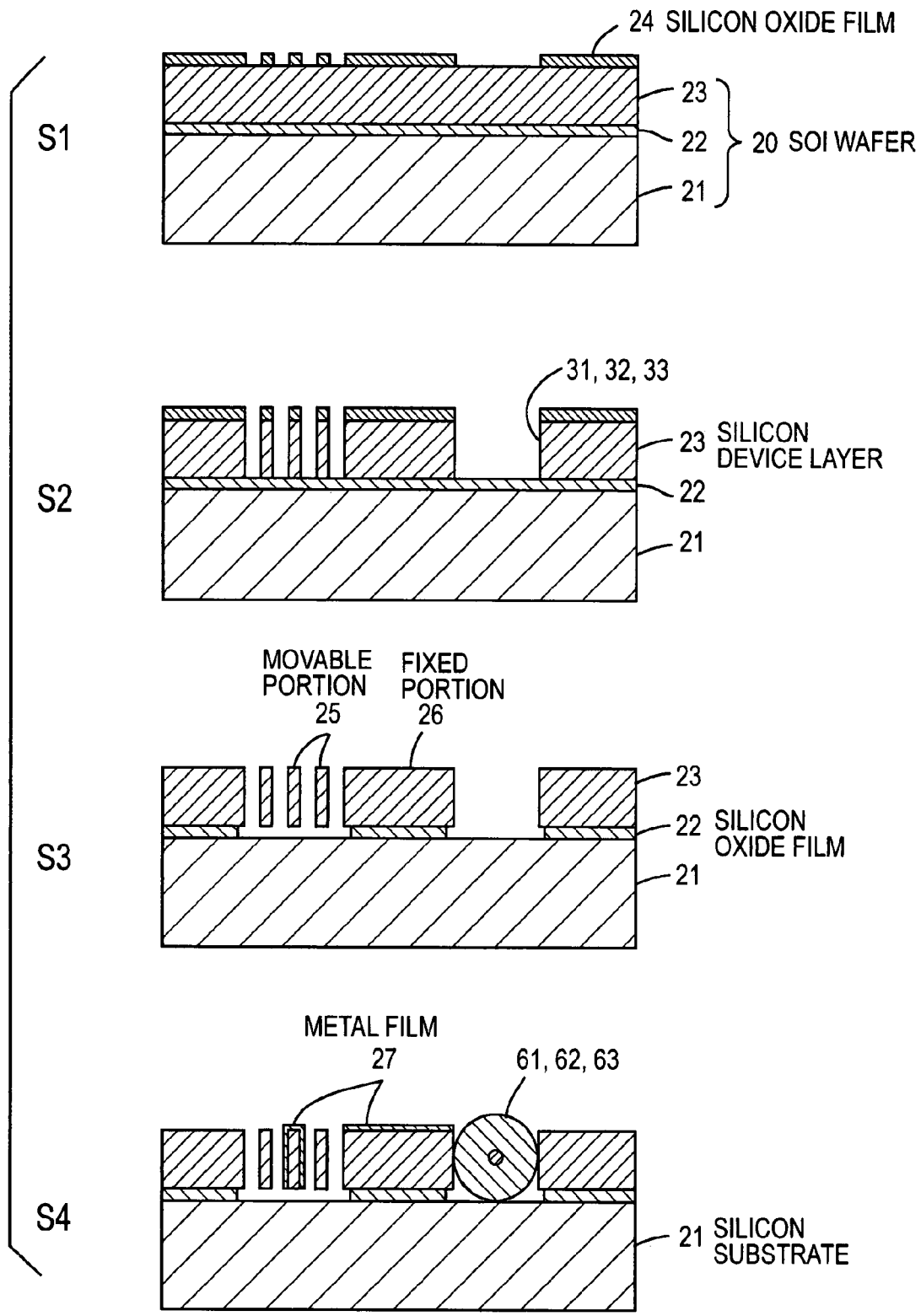
FIG. 4 is a process drawing for explaining an example of a method of fabricating the optical switch.
Figure 5A:
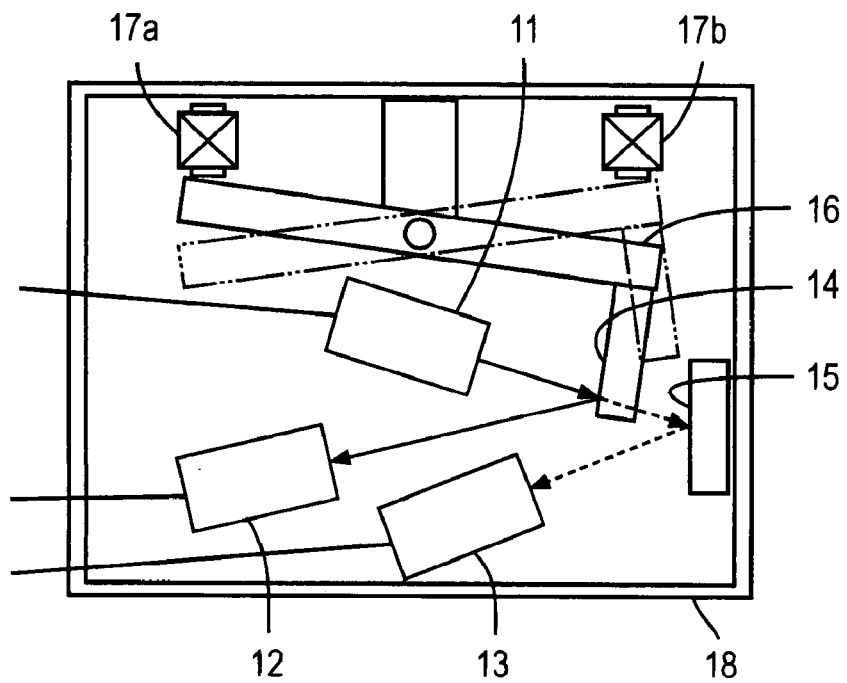
FIG. 5A is an explanatory drawing of a conventional structural example of a 1×2 optical switch.
Figure 5B:
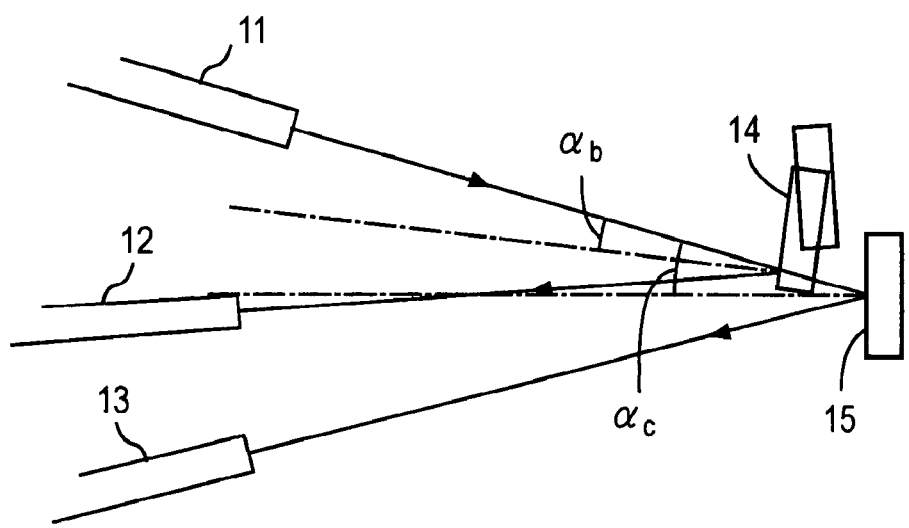
FIG. 5B is an explanatory drawing of the operations of FIG. 5A.

FIG. 1 shows the configuration of an example of a 1×2 optical switch according to the present invention. In this example, the optical switch is configured by a MEMS and is fabricated using an SOI (Silicon on insulator) wafer 20 having a three-layer structure of a silicon substrate 21, a silicon oxide film 22, and a silicon device layer 23 as shown in FIG. 4 (described later). The following constituent elements are formed by etching and removing the silicon device layer 23 and the silicon oxide film 22 on the silicon substrate 21 when necessary.

In this example, an optical fiber is used as optical waveguide means and three fiber grooves (fiber guides) 31 to 33 for positioning and receiving the ends of optical fibers are formed to extend from the inner side to the outer periphery of the silicon substrate 21. The inner ends of the fiber grooves 31 to 33 are combined on a point to form a mirror chamber 34, and each of the fiber grooves 32 and 33 is formed at an acute angle with respect to the fiber groove 31 disposed between the fiber grooves 32 and 33. The outer ends (open ends) of the fiber grooves 31 to 33 are formed to gradually expand toward the outside. In FIG. 1, the optical fibers are not shown.

In the mirror chamber 34 formed by combining the inner ends of the three fiber grooves 31 to 33, a fixed mirror 35 is disposed and a movable mirror 36 is also disposed. The fixed mirror 35 is formed to protrude from the inner wall of the mirror chamber 34 and the movable mirror 36 is integrally formed with the end of a movable rod 38.

The movable rod 38 is disposed in a rod groove 39 communicating with the mirror chamber 34. In a middle section of the extending direction of the long movable rod 38 and on the base end opposite to the end where the movable mirror 36 is formed, a pair of hinges 41a and 41b and a pair of hinges 42a and 42b are formed to extend and protrude on both sides in the width direction of the movable rod 38. The movable rod 38 is supported by the hinges 41a and 41b and the hinges 42a and 42b such that the movable rod 38 can be displaced in the longitudinal direction. The hinges 41a and 41b and the hinges 42a and 42b act as leaf springs, and the ends of the hinges on the opposite side from the movable rod 38 are supported by a fixed part 37. The hinges 41a and 41b and the hinges 42a and 42b are respectively disposed in recessed portions 43 to 46 communicating with the rod groove 39.

Between the hinges 41a and 41b and the hinges 42a and 42b, a comb electrostatic actuator is disposed on the movable rod 38. The comb electrostatic actuator is made up of fixed comb electrodes 51 and 52 and movable comb electrodes 47. The movable comb electrodes 47 are formed on support beams 48a and 48b so as to protrude to the hinges 41a and 41b and the hinges 42a and 42b. The support beams 48a and 48b are formed to protrude on both sides in the width direction of the movable rod 38. Further, the movable comb electrodes 47 are electrically connected to the fixed part 37 via the support beams 48a and 48b, the movable rod 38, the hinges 41a, 41b, 42a and 42b.

In the extending direction of the movable rod 38, the first fixed comb electrodes 51 and the second fixed comb electrodes 52 are disposed on both sides of the movable comb electrodes 47 such that the fixed comb electrodes 51 and 52 are engaged with the movable comb electrodes 47. The first and second fixed comb electrodes 51 and 52 are formed to protrude from fixed portions 53a and 53b and the fixed portions 54a and 54b, respectively. In FIG. 1, reference numerals 55a, 55b, 56a and 56b denote terminal portions continuing from the fixed portions 53a, 53b, 54a and 54b, respectively.

Figure 2:
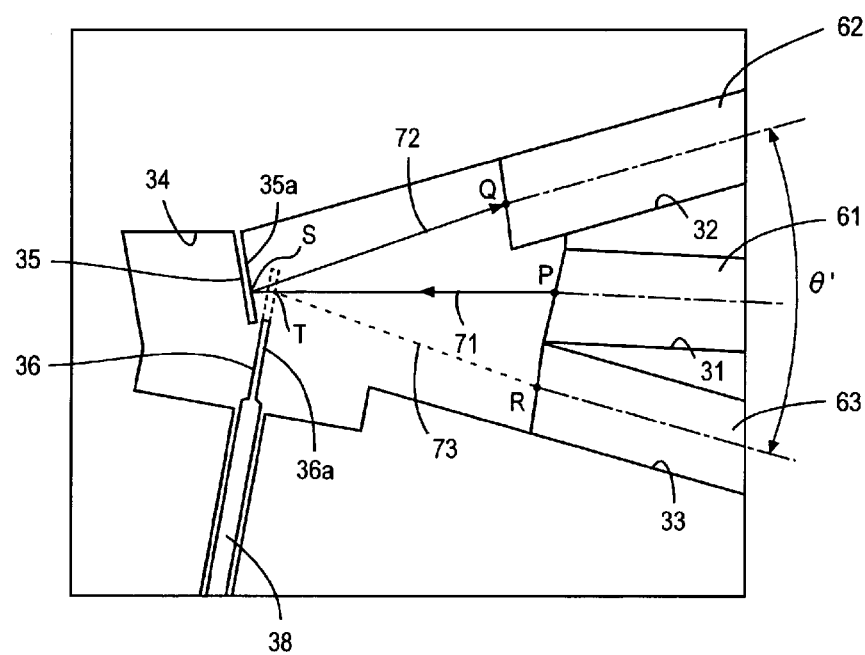
FIG. 2 is a partial enlarged plan view showing a main part of FIG. 1 in a state in which optical fibers are mounted.

FIG. 2 is an enlarged view of the detail of a main part of FIG. 1. In FIG. 2, the ends of the optical fibers are received in the fiber grooves 31 to 33. The end of an optical fiber 61 disposed in the fiber groove 31 is used as an input port and the ends of optical fibers 62 and 63 disposed in the fiber grooves 32 and 33 are used as first and second output ports, respectively.

Although the detailed illustration of the optical fibers 61 to 63 is omitted, it is assumed that the ends of the optical fibers 61 to 63 have rod lenses and the optical fibers 61 to 63 have a condensing function. The rod lens can be, for example, a graded index optical fiber (GI fiber) reduced in length. Further, it is assumed that the end faces of the optical fibers 61 to 63 (the end faces of the rod lenses) are polished diagonally with respect to the axes of the optical fibers and orthogonally with respect to a surface of the fixed part 37, so that the optical fibers 61 to 63 have inclined end faces. Further, the optical fibers 62 and 63 are disposed such that the normal lines of the inclined end faces are directed outward with respect to the optical axes of the optical fibers 62 and 63 in a plane parallel with a surface of the silicon substrate 21. With this configuration, an angle formed by the optical axes of the optical fibers 62 and 63 can be larger than an angle formed by the axes of reflected light beams 72 and 73 from mirror surfaces 35a and 36a to the end faces of the optical fibers 62 and 63. It is thus possible to reduce distances between the end faces of the optical fibers 61, 62 and 63 and the mirror surfaces 35a and 36a, accordingly.

Figure 3A:
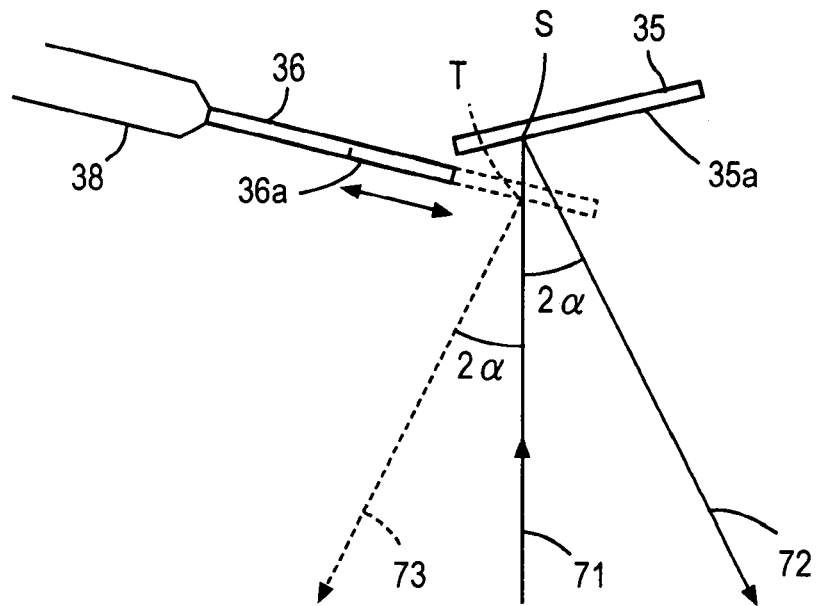
FIG. 3A shows the detail of the optical paths of the optical switch shown in FIG. 1.

The operations of the optical switch will be described below. In the initial state (first stable state) after the optical switch is fabricated, the movable mirror 36 is placed on positions shown in FIGS. 1 and 2. At this time, as shown in FIG. 3A, an incident light beam 71 from the optical fiber 61 is reflected on the mirror surface 35a of the fixed mirror 35, and the reflected light beam 72 is incident in the optical fiber 62.

When a voltage is applied to the second fixed comb electrodes 52 while the fixed part 37 electrically connected to the movable comb electrodes 47 and the first fixed comb electrodes 51 are grounded, an electrostatic attraction force is applied between the second fixed comb electrodes 52 and the movable comb electrodes 47. When the electrostatic attraction force is larger than the holding powers of the hinges 41a, 41b, 42a and 42b in the first stable state, the hinges 41a, 41b, 42a and 42b are inverted to a second stable state. Even when the application of the voltage is interrupted, the hinges are self-held in this state. At this time, the movable rod 38 is displaced in the extending direction so as to further move the movable mirror 36 into the mirror chamber 34. Thus, as indicated by a broken line of FIG. 3A, the movable mirror 36 is inserted onto the optical path of the incident light beam 71 emitted from the optical fiber 61. Therefore, the incident light beam 71 is reflected on the mirror surface 36a of the movable mirror 36 and the reflected light beam 73 is incident in the optical fiber 63. As shown in FIG. 3A, the mirror surface 36a is driven in the in-plane direction of the mirror as indicated by an arrow, so that the optical axis of the reflected light beam 73 can be kept on a fixed position regardless of a reflection position on the mirror surface 36a.

On the other hand, when a voltage is applied to the first fixed comb electrodes 51 while the fixed part 37 and the second fixed comb electrodes 52 are grounded, an electrostatic attraction force is applied between the first fixed comb electrodes 51 and the movable comb electrodes 47. When the electrostatic attraction force is larger than the holding powers of the hinges 41a, 41b, 42a and 42b in the second stable state, the hinges 41a, 41b, 42a and 42b are inverted back to the first stable state.

As described above, the hinges 41a, 41b, 42a and 42b have a bistable structure in this example. By driving the comb electrostatic actuator, the movable mirror 36 is driven and inserted/withdrawn to a position at the front of the fixed mirror 35 to switch the optical paths. A voltage is applied to the first fixed comb electrodes 51 and the second fixed comb electrodes 52 via, for example, bonding wires connected to the terminal portions 55a, 55b, 56a and 56b.

The following will describe the detail of the optical paths from the optical fiber 61 to the optical fibers 62 and 63. As described above, the optical fibers 62 and 63 are disposed on the opposite sides of the optical fiber 61 so as to form acute angles with respect to the optical fiber 61, and the incident angle of the incident light beam 71 on the mirror surface 35a of the fixed mirror 35 from the optical fiber 61 and the incident angle on the mirror surface 36a of the movable mirror 36 are equalized as shown in FIG. 3A. In this example, the incident angle $\alpha$ is set at 10° and thus the optical axes of the reflected light beams 72 and 73 form an angle $\theta$ ($\theta=4\alpha=40°$).

On the other hand, since it is assumed that the optical fibers 61 to 63 have the inclined end faces as described above, an angle $\theta'$ (see FIG. 2) formed by the optical axes of the optical fibers 62 and 63 is smaller than $\theta=40°$ described above.

In other words, when the air has a refractive index of 1, $\theta'$ is obtained as expressed by the following formula:

$$\theta' = \theta - 2\{\sin^{-1}(n \sin \beta) - \beta\}$$

where n represents the central refractive indexes of the ends of the optical fibers 62 and 63 (the central refractive indexes of the rod lenses on the ends) and $\beta$ represents the angle of inclination of the end face. When n is 1.46 and $\beta$ is 8°, the angle $\theta'$ formed by the optical axes of the optical fibers 62 and 63 is 32.6°.

On the other hand, when the centers of the end faces of the optical fibers 61 to 63 are denoted as P, Q and R as shown in FIG. 2, a reflection point of the incident light beam 71 on the mirror surface 35a is denoted as S, and a reflection point on the mirror surface 36a is denoted as T, an optical path length PS+SQ and an optical path length PT+TR are equalized in this example, that is, an optical path length from the end face of the optical fiber 61 to the end face of the optical fiber 62 via the mirror surface 35a and an optical path length from the end face of the optical fiber 61 to the end face of the optical fiber 63 via the mirror surface 36a are equalized. The optical path length is denoted as L (=PS+SQ=PT+TR).

In order to suppress the expansion of light, it is preferable to shorten the optical path length L of light propagating through the air. Further, in order to minimize a distance between a beam waist and the mirror surfaces 35a and 36a, it is preferable to shorten a distance between the mirror surfaces 35a and 36a on an optical path. A necessary mirror diameter can be reduced by disposing the mirror surface on a beam waist.

In this example, the end faces of the optical fibers 61 to 63 are brought quite close to the mirror surfaces 35a and 36a and a distance between the mirror surfaces 35a and 36a on an optical path is extremely short.

When the optical fibers 61 to 63 are $\phi$125 μm in diameter (clad diameter), as numerical examples, L=750 μm can be set and a distance between the mirror surfaces 35a and 36a (a distance between points T and S) on an optical path is set at 24.5 μm. These numerical examples are quite smaller than the numerical examples described in the conventional art. In this case, the ends of the optical fibers 61 to 63 are brought quite close to one another, that is, the ends of the optical fibers 61 to 63 are disposed close to one another as much as possible. For example, a distance between points P and R is set at 130 μm.

Considering that the movable mirror 36 attached to the movable rod 38 is preferably as small as possible, the beam waist of the incident light beam 71 incident from the optical fiber 61 is preferably formed on, for example, the mirror surface 36a. However, as described above, the mirror surfaces 35a and 36a can be disposed close to each other in this example, so that the beam waist of the incident light beam 71 may be formed on any given point between the position T of the mirror surface 36a inserted on the optical path and the position S of the mirror surface 35a.

According to the foregoing example, an incident angle formed by the incident light beam 71 incident on the mirror surface 35a of the fixed mirror 35 from the optical fiber 61 (input port) and an incident angle on the mirror surface 36a of the movable mirror 36 are equalized. Further, an optical path length from the end face of the optical fiber 61 to the end face of the optical fiber 62 through the mirror surface 35a and an optical path length from the end face of the optical fiber 61 to the end face of the optical fiber 63 through the mirror surface 36a are equalized. Therefore, it is possible to accurately match the polarization states of the two outgoing light beams emitted to the optical fibers 62 and 63 (the first and second output ports). Moreover, each of the optical fibers 62 and 63 forms an acute angle with respect to the optical fiber 61 and thus the incident angle α of the incident light beam 71 incident on the mirror surfaces 35a and 36a is an acute angle. In this respect, a preferable polarization state can be obtained.

Further, since the optical fibers 62 and 63 are disposed on the opposite sides of the optical fiber 61, the end faces of the optical fibers 62 and 63 are not close to each other. Moreover, since the reflected light beams 72 and 73 from the mirror surfaces 35a and 36a travel in opposite directions, it is possible to considerably reduce crosstalk in which, for example, the reflected light beam 72 to be optically coupled to the optical fiber 62 is optically coupled to the other optical fiber 63. Thus, excellent crosstalk performance can be obtained.

Figure 6:
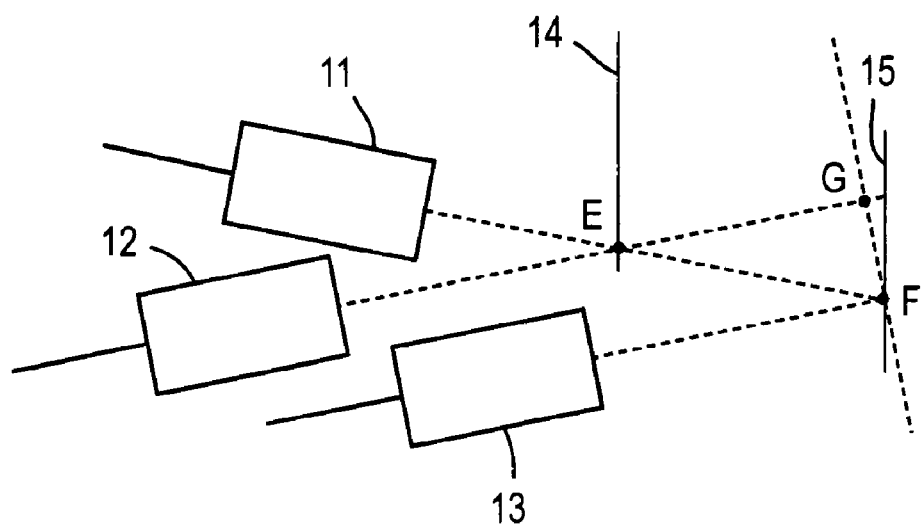
FIG. 6 is an explanatory drawing of a problem arising when incident angles with respect to two mirrors are equalized in a conventional structural example in which two output ports are disposed on the same side of an input port.

Additionally, since the optical fibers 62 and 63 are disposed thus on the opposite sides of the optical fiber 61, the optical fibers 62 and 63 do not overlap each other. In other words, the end faces of the optical fibers 62 and 63 can be equally brought close to, for example, the mirror surface 35a. Thus the mirror surface 36a can be brought quite close to the mirror surface 35a on the optical path. Therefore, the optical path is configured to reduce the sizes of light spots both on the mirror surfaces 35a and 36a and prevent the expansion of one of the light spots unlike the conventional example shown in FIG. 6. In this respect, the aforementioned optical switch is quite suitable for a MEMS configuration.

As described above, the end faces of the optical fibers 62 and 63 acting as the first and second output ports are inclined and the optical fibers 62 and 63 are disposed such that the normal lines of the inclined end faces are directed outward with respect to the optical axes of the optical fibers, so that the angle θ' formed by the optical axes of the optical fibers 62 and 63 can be smaller than the angle θ formed by the optical axes of the reflected light beams 72 and 73 incident on the optical fibers 62 and 63. Thus, the angle formed by the optical fibers 62 and 63 can be further reduced. In this respect, the optical switch can be further miniaturized and integrated.

FIG. 4 schematically shows a process for fabricating the above MEMS optical switch. The steps of the process will be described below.

Step S1: A silicon oxide film 24 is formed on a surface of a silicon device layer 23 of an SOI wafer 20, and the silicon oxide film 24 is patterned by photolithography and etching.

Step S2: Anisotropic etching is performed vertically on the silicon device layer 23 with the silicon oxide film 24 serving as a mask. The etching is performed by, for example, ICP-RIE (reactive ion etching using inductively coupled plasma). In this step, the fiber grooves 31, 32 and 33, the mirror chamber 34, the movable rod groove 39, the recessed portions 43 to 46, and the like are formed and the outside shape is accordingly formed which includes the fixed mirror 35, the movable mirror 36, the movable rod 38, the hinges 41a, 41b, 42a and 42b, and the comb electrodes 47, 51 and 52.

Step S3: By dipping a chip into hydrogen fluoride, the silicon oxide film 22 under a configuration to be formed as a movable portion 25 is etched and removed. The silicon oxide film 22 under a fixed portion 26 remains. The fixed portion 26 has a larger width (a larger area) than the thin movable portion 25.

Step S4: Metallization is performed on, for example, necessary portions such as a mirror and an electrode pad to form metal films 27 on the surfaces. The optical switch is completed by mounting an optical fiber 60.

In the example shown in FIGS. 1, 2 and 3A, the two separate mirrors are used. The two mirrors are the fixed mirror 35 having the mirror surface 35a and the movable mirror 36 having the mirror surface 36a. In place of the two mirrors 35 and 36, an integrated movable mirror having the two mirror surfaces 35a and 36a may be used.

Figure 3B:
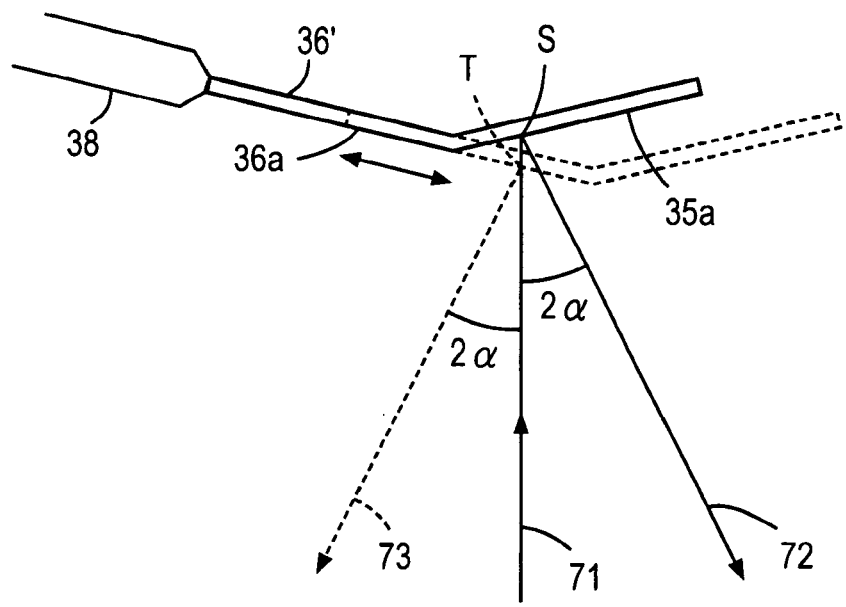
FIG. 3B is a view of a configuration and optical paths when an integrated movable mirror including a first mirror surface and a second mirror surface is used.

FIG. 3B shows an integrated movable mirror 36'. The movable mirror 36' is configured such that the configuration of the fixed mirror 35 is integrally formed on the end of the movable mirror 36. The movable mirror 36' is integrally formed on the end of the movable rod 38 like the movable mirror 36. Like the movable mirror 36 of FIG. 3A, the movable mirror 36' is driven by the comb electrostatic actuator in parallel with the mirror surface 36a. Further, in the initial state after the optical switch is fabricated, the mirror surface 36a is located outside the optical path as indicated by a solid line in FIG. 3B and the incident light beam 71 is incident on the mirror surface 35a.

Assuming that a first state is the state of the hinges 41a, 41b, 42a and 42b in the initial stable state after the bistable optical switch is fabricated and a second state is the state of the hinges after the movable rod 38 is moved in the axial direction by the first voltage application and the switch is brought into a second stable state, the accuracy of reproducing the position and the direction of the movable rod in the stable state is generally lower in the second state than the first state. Thus, in order to minimize the influence of the low accuracy, it is preferable to arrange such that when the hinges are in the first state, light is incident on the mirror surface not parallel with the driving axis (driving direction) of the actuator. With this arrangement, when the hinges are in the second state, even if the accuracy of reproducing the position of the mirror surface 36a is low in a movable direction indicated by an arrow, the position of the optical axis of the reflected light beam 73 is not affected by the low accuracy.

With the movable mirror 36' shown in FIG. 3B, a required clearance between the movable mirror 36 and the fixed mirror 35 in FIG. 3A is not necessary. Accordingly, it is possible to further reduce a distance between the mirror surfaces 35a and 36a on the optical path (a distance between the points T and S).

In the foregoing description, the optical fibers are used as optical waveguide means. The optical waveguide means is not limited to optical fibers. For example, the optical waveguide means may be optical waveguides formed on a substrate. In this case, each optical waveguide may have, for example, a curved end face to provide a condensing function.

Further, in the foregoing examples, the central optical fiber 61 is used as an input port and the optical fibers 62 and 63 on both sides of the optical fiber 61 are used as output ports as shown in FIG. 2. The two optical fibers 62 and 63 on both sides may be used as first and second input ports, the optical fiber 61 may be used as an output port, and light from one of the first and second input ports may be selected and outputted to the output port (the optical fiber 61) by the switch. Also in this case, the changes in the polarization states of light inputted to the first and second input ports and reaching the output port are almost equal to each other.

EFFECTS OF THE INVENTION

According to the present invention, it is possible to match the polarization states of two outgoing light beams in an optical switch and achieve excellent crosstalk performance.

Moreover, according to the present invention, two mirror surfaces can be disposed quite close to each other on an optical path as compared with the conventional art and thus the sizes of light spots on the mirror surfaces can be reduced, that is, the position of the beam waist of light can be substantially aligned with the mirror surfaces. In this respect, the optical switch can be easily configured by a MEMS.

What is claimed is:

1. An optical switch, comprising:
   a substrate;
   mirror means disposed on the substrate, the mirror means having first and second mirror surfaces whose extended surfaces intersecting each other and being orthogonal to a surface of the substrate;
   first optical waveguide means disposed on the substrate, the first optical waveguide means having an end forming an optical path at an equal angle with respect to the first mirror surface and the second mirror surface;
   second and third optical waveguide means disposed on the substrate so as to form acute angles with respect to both sides of the first optical waveguide means, the second and third optical waveguide means having ends optically coupled to the end of the first optical waveguide means in response to reflection on the first and second mirror surfaces; and
   an actuator disposed on the substrate, the actuator driving the mirror means to optically couple the end of the second or third optical waveguide means and the end of the first optical waveguide means through one of the first mirror surface and the second mirror surface;
   wherein an optical path length between the ends of the first and second optical waveguide means optically coupled through the first mirror surface and an optical path length between the ends of the first and third optical waveguide means optically coupled through the second mirror surface are equal to each other.

2. The optical switch according to claim 1, wherein the first mirror surface is fixed on the substrate and the second mirror surface is driven by the actuator and inserted to a position interrupting an optical path between the first mirror surface and the end of the first optical waveguide means.

3. The optical switch according to claim 1, wherein light from the end of the first optical waveguide means forms a beam waist on any given position between a front position where the second mirror surface is moved in and out and a position where the first mirror surface is irradiated with the light.

4. The optical switch according to claim 1, wherein the mirror means is made up of a fixed mirror having the first mirror surface and a movable mirror having the second mirror surface.

5. The optical switch according to claim 1, wherein the mirror means is made up of an integrated movable mirror having the first mirror surface and the second mirror surface.

6. The optical switch according to claim 4 or 5, wherein the actuator drives the movable mirror in a direction in a plane of the second mirror.

7. The optical switch according to any one of claims 1 to 5, wherein the second and third optical waveguide means have inclined end faces and the inclined endfaces whose normal lines are directed outward with respect to optical axes of the second and third optical waveguide means in a plane parallel with the surface of the substrate.

8. The optical switch according to claim 7, wherein the ends of the first, second, and third optical waveguide means are optical fibers having rod lenses.

9. The optical switch according to claim 7, wherein the end of the first optical waveguide means is an input port for causing light to be incident on the mirror means, and the ends of the second and third optical waveguide means are output ports for receiving light reflected from the mirror means.

10. The optical switch according to claim 7, wherein the ends of the second and third optical waveguide means are input ports for causing light to be incident on the mirror means, and the end of the first optical waveguide means is an output port for receiving light reflected from the mirror means.

* * * * *